United States Patent
Anthony et al.

(10) Patent No.: US 9,222,303 B2
(45) Date of Patent: Dec. 29, 2015

(54) SYSTEM FOR CONFINING LIFT CORDS IN COVERINGS FOR ARCHITECTURAL OPENINGS

(71) Applicant: Hunter Douglas Inc., Pearl River, NY (US)

(72) Inventors: James M. Anthony, Denver, CO (US); Ralph G. Jelic, Boulder, CO (US); Joseph E. Kovach, Brighton, CO (US); Robert A. Simons, Littleton, CO (US)

(73) Assignee: Hunter Douglas Inc., Pearl River, NY (US)

( * ) Notice: Subject to any disclaimer, the term of this patent is extended or adjusted under 35 U.S.C. 154(b) by 0 days.

(21) Appl. No.: 14/306,018

(22) Filed: Jun. 16, 2014

(65) Prior Publication Data

US 2014/0290877 A1 Oct. 2, 2014

Related U.S. Application Data

(63) Continuation of application No. 13/914,168, filed on Jun. 10, 2013, now Pat. No. 8,783,330, which is a continuation of application No. 13/022,153, filed on Feb. 7, 2011, now Pat. No. 8,474,507, which is a (Continued)

(51) Int. Cl.
*E06B 9/326* (2006.01)
*E06B 9/32* (2006.01)

(Continued)

(52) U.S. Cl.
CPC . *E06B 9/32* (2013.01); *E06B 9/262* (2013.01); *E06B 9/326* (2013.01); *F16G 11/00* (2013.01); *E06B 2009/2627* (2013.01); *Y10T 24/3982* (2015.01)

(58) Field of Classification Search
CPC .............. E06B 2009/2622; E06B 2009/2625; E06B 2009/2627; E06B 9/326; Y10T 24/3982
USPC ....... 160/84.01, 84.04, 84.05, 168.1 R, 173 R
See application file for complete search history.

(56) References Cited

U.S. PATENT DOCUMENTS

| 300,063 A | 6/1884 | Geertz |
| 1,482,978 A | 2/1924 | Edwards |

(Continued)

FOREIGN PATENT DOCUMENTS

| CN | 2675835 Y | 2/2005 |
| WO | 2010/021841 A1 | 2/2010 |

OTHER PUBLICATIONS

PCT International Search Report dated Mar. 1, 2011, PCT Application No. PCT/US2010/061918, filed Dec. 22, 2010, 2 pages.

(Continued)

*Primary Examiner* — Blair M Johnson
(74) *Attorney, Agent, or Firm* — Dorsey & Whitney LLP

(57) ABSTRACT

A system for incorporation into a retractable covering that includes a flexible lift cord extending from a headrail to a bottom rail. The system includes a flexible protector of a length similar to that of an associated lift cord with the lift cord being operatively connected to the protector. The protector is in turn connected to a fabric extending between the headrail and the bottom rail at predetermined spaced locations so that any loop of protector formable is limited by the spacing between the locations at which the protector is connected to the fabric. The maximum size of a loop so formed in the protector and thus the lift cord associated therewith is insufficient to encapsulate a body part of a child or infant.

20 Claims, 20 Drawing Sheets

Related U.S. Application Data continuation-in-part of application No. PCT/US2009/052802, filed on Aug. 5, 2009, and a continuation of application No. PCT/US2010/061918, filed on Dec. 22, 2010.

(60) Provisional application No. 61/091,049, filed on Aug. 22, 2008, provisional application No. 61/165,777, filed on Apr. 1, 2009.

(51) Int. Cl.
*E06B 9/262* (2006.01)
*F16G 11/00* (2006.01)

(56) References Cited

U.S. PATENT DOCUMENTS

| | | | |
|---|---|---|---|
| 2,049,518 A | 8/1936 | Schier |
| 2,254,820 A | 9/1941 | Donner |
| 2,310,014 A | 2/1943 | Apfel |
| 3,160,202 A | 12/1964 | Rosen |
| 4,765,388 A | 8/1988 | Dohlemann |
| 4,817,698 A | 4/1989 | Rossini et al. |
| 4,921,032 A | 5/1990 | May |
| 5,495,883 A | 3/1996 | Jelic |
| 5,513,687 A | 5/1996 | Tuzmen et al. |
| 5,597,027 A | 1/1997 | Simon et al. |
| 5,613,540 A | 3/1997 | Jelic |
| 5,645,685 A | 7/1997 | Furhman |
| 5,706,876 A | 1/1998 | Lysyj |
| 5,709,258 A | 1/1998 | Coccoluto |
| 5,722,478 A | 3/1998 | Claypool et al. |
| 5,743,319 A | 4/1998 | Christopherson |
| 5,778,957 A | 7/1998 | Torgersen |
| 5,797,441 A | 8/1998 | Benthin |
| 5,894,876 A | 4/1999 | O'Brien |
| 5,918,657 A | 7/1999 | Tuzmen |
| 6,089,303 A | 7/2000 | Metcalf et al. |
| 6,179,035 B1 | 1/2001 | Anderson |
| 6,463,987 B1 | 10/2002 | Nevins |
| 6,543,516 B2 | 4/2003 | Hwang |
| 6,644,374 B2 | 11/2003 | Nien |
| 6,662,845 B1 | 12/2003 | Palmer |
| 6,752,194 B1 | 6/2004 | Huang |
| 6,792,995 B2 | 9/2004 | Judkins |
| 7,124,801 B2 | 10/2006 | Ng et al. |
| 7,198,087 B2 | 4/2007 | Hsu |
| 7,556,080 B2 | 7/2009 | Nien |
| 7,624,784 B2 | 12/2009 | Anthony et al. |
| 7,673,665 B2 | 3/2010 | Rossato |
| 7,823,620 B2 | 11/2010 | Kirby |
| 7,823,953 B2 | 11/2010 | Haas |
| 7,823,955 B2 | 11/2010 | Alacqua et al. |
| 7,828,036 B2 | 11/2010 | Tran |
| 7,828,037 B2 | 11/2010 | Crider |
| 7,828,038 B2 | 11/2010 | Livacich |
| 7,828,039 B2 | 11/2010 | Starzmann et al. |
| 7,828,040 B2 | 11/2010 | Miyachi et al. |
| 7,828,041 B2 | 11/2010 | Schlecht |
| 7,830,600 B2 | 11/2010 | Jiang |
| 7,832,052 B2 | 11/2010 | Vrielink |
| 7,832,450 B2 | 11/2010 | Brace et al. |
| 7,832,451 B2 | 11/2010 | Miller et al. |
| 7,832,452 B2 | 11/2010 | Deschenes |
| 7,832,453 B2 | 11/2010 | Lin |
| 7,832,454 B2 | 11/2010 | Lyons |
| 7,832,455 B1 | 11/2010 | Johnston et al. |
| 7,833,368 B2 | 11/2010 | Judkins et al. |
| 7,836,936 B2 | 11/2010 | Graichen |
| 7,836,937 B2 | 11/2010 | Anderson et al. |
| 7,841,027 B2 | 11/2010 | Sample |
| 7,841,376 B2 | 11/2010 | Lin |
| 7,841,377 B2 | 11/2010 | Coenraets |
| 7,841,378 B2 | 11/2010 | Henning |
| 7,843,640 B2 | 11/2010 | Hooper, Jr. |
| 7,845,383 B2 | 12/2010 | Bowman |
| 7,931,066 B2 | 4/2011 | Honda et al. |
| 8,079,397 B2 | 12/2011 | Robertson |
| 8,316,911 B2 | 11/2012 | Cleaver |
| 8,474,507 B2 | 7/2013 | Anthony et al. |
| 8,783,330 B2 | 7/2014 | Anthony et al. |
| 2004/0089428 A1 | 5/2004 | Judkins |
| 2004/0231804 A1 | 11/2004 | Ward et al. |
| 2004/0231805 A1 | 11/2004 | Sudano |
| 2005/0092448 A1 | 5/2005 | Lin |
| 2006/0060308 A1 | 3/2006 | LeBlanc |
| 2007/0277935 A1 | 12/2007 | Lin |
| 2008/0295975 A1 | 12/2008 | Lin |
| 2010/0252209 A1 | 10/2010 | Wang |
| 2010/0276088 A1 | 11/2010 | Jelic et al. |
| 2010/0276089 A1 | 11/2010 | Jelic et al. |
| 2010/0276090 A1 | 11/2010 | Zagone |
| 2010/0276091 A1 | 11/2010 | Niswonger |
| 2010/0280666 A1 | 11/2010 | Marchetto |
| 2010/0282418 A1 | 11/2010 | Lucas |
| 2010/0282419 A1 | 11/2010 | Ligas, Sr. |
| 2010/0282420 A1 | 11/2010 | Lai |
| 2010/0282421 A1 | 11/2010 | Lin |
| 2010/0288446 A1 | 11/2010 | Foley et al. |
| 2010/0288447 A1 | 11/2010 | Filipiak, Jr. et al. |
| 2010/0288448 A1 | 11/2010 | Hormann et al. |
| 2010/0288449 A1 | 11/2010 | Chang et al. |
| 2010/0288450 A1 | 11/2010 | Bruck et al. |
| 2010/0288451 A1 | 11/2010 | Bohlen |
| 2010/0288452 A1 | 11/2010 | Coenraets |
| 2010/0288453 A1 | 11/2010 | Richardson |
| 2010/0288454 A1 | 11/2010 | Lin et al. |
| 2010/0288455 A1 | 11/2010 | Liscano |
| 2010/0294437 A1 | 11/2010 | Gonzales |
| 2010/0294438 A1 | 11/2010 | Kirby et al. |
| 2010/0294439 A1 | 11/2010 | Su |
| 2010/0294440 A1 | 11/2010 | Li et al. |
| 2010/0294441 A1 | 11/2010 | Ligas, Sr. et al. |
| 2010/0294442 A1 | 11/2010 | Lange |
| 2011/0005690 A1 | 1/2011 | Harding |
| 2011/0017410 A1 | 1/2011 | Yamashita et al. |
| 2011/0017411 A1 | 1/2011 | Yeh |
| 2011/0024065 A1 | 2/2011 | Lin |
| 2011/0036512 A1 | 2/2011 | Su |
| 2011/0036517 A1 | 2/2011 | Chen |
| 2011/0036518 A1 | 2/2011 | Yang |
| 2011/0048652 A1 | 3/2011 | Chen |
| 2011/0048653 A1 | 3/2011 | McCarty et al. |
| 2011/0048657 A1 | 3/2011 | Tung et al. |
| 2011/0056633 A1 | 3/2011 | Lin |
| 2011/0067819 A1 | 3/2011 | Huang |
| 2011/0073260 A1 | 3/2011 | Kollman et al. |
| 2011/0083814 A1 | 4/2011 | Lane |
| 2011/0083816 A1 | 4/2011 | Chen |
| 2011/0083818 A1 | 4/2011 | Cross |
| 2011/0100569 A1 | 5/2011 | Perkowitz |
| 2011/0126990 A1 | 6/2011 | Huang |
| 2011/0180221 A1 | 7/2011 | Huang |
| 2011/0186242 A1 | 8/2011 | Foley et al. |
| 2011/0209834 A1 | 9/2011 | Lowry et al. |
| 2011/0232852 A1 | 9/2011 | Perkowitz |

OTHER PUBLICATIONS

PCT International Search Report dated Sep. 17, 2009, PCT Application No. PCT/US2009/052802, filed Aug. 5, 2009, 2 pages.

"2nd Provisional American National Standard for Safety of Corded Window Covering Products", Window Covering Manufacturing Association (WCMA), ANSI/WCMA A100.1-2010 (PS2), Revision of Provisional ANSI/WCMA 100.1-2009 dated Sep. 3, 2010, 46 pages.

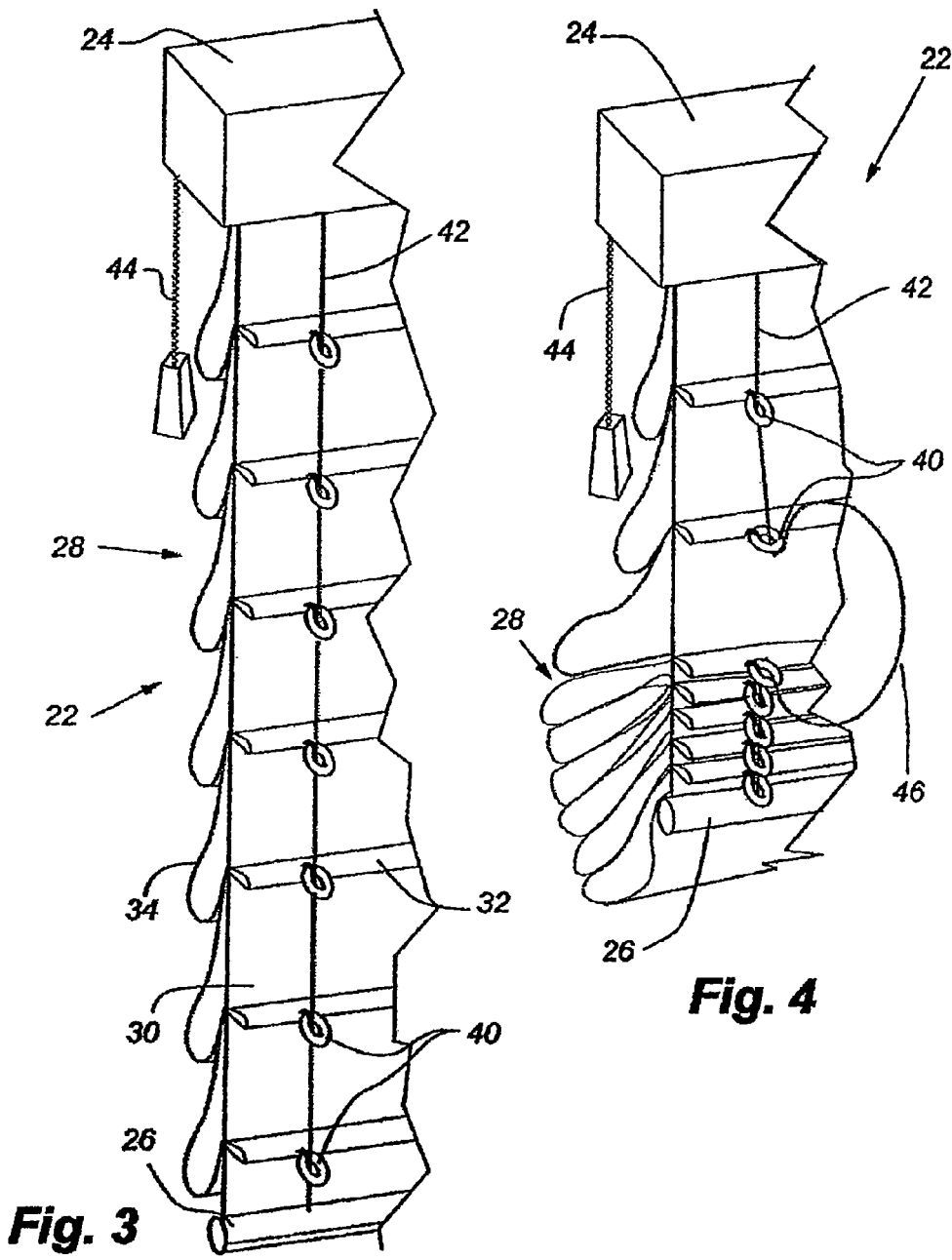

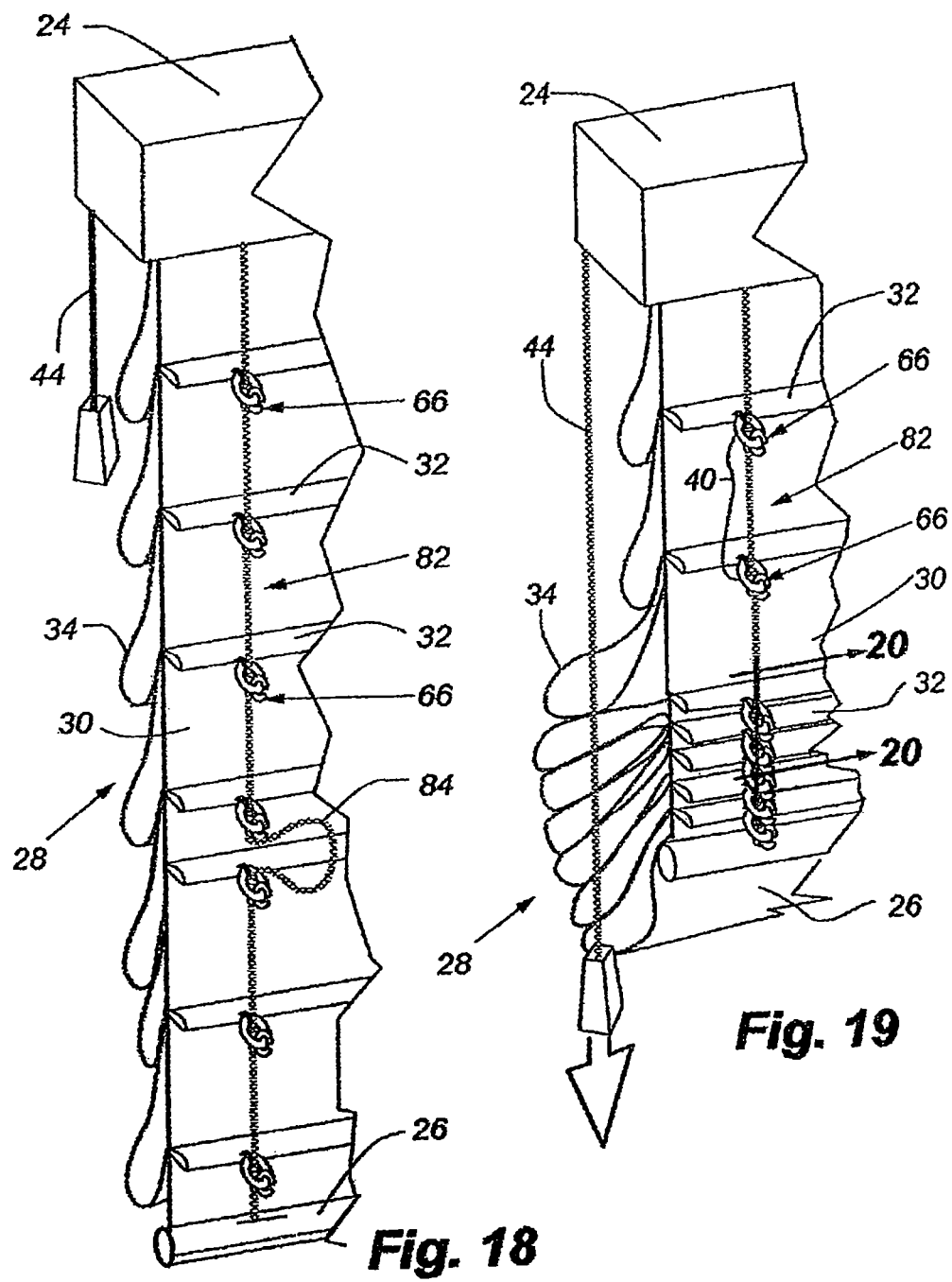

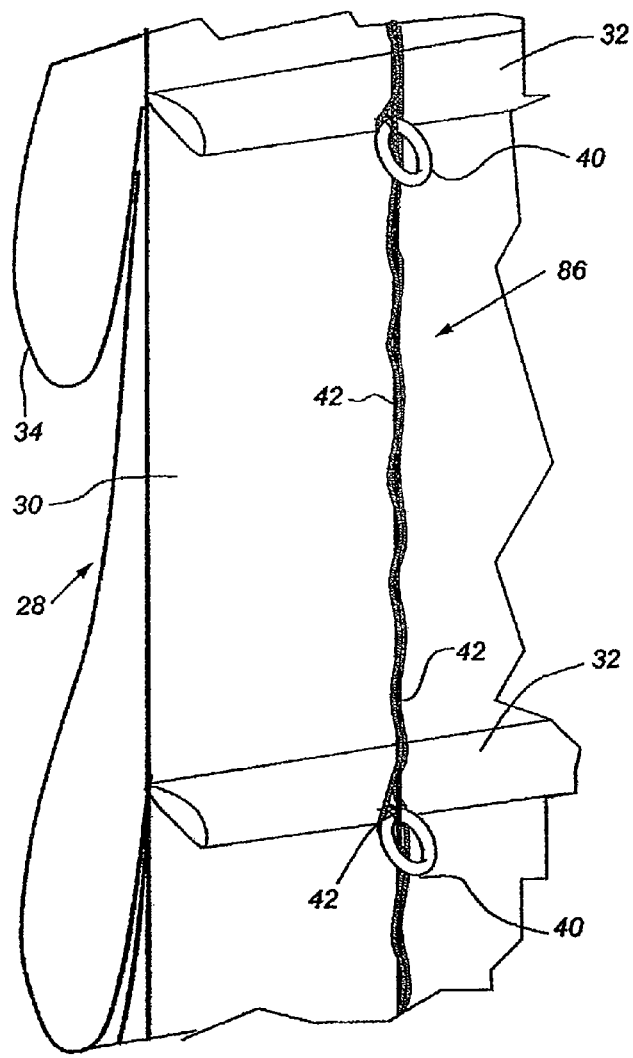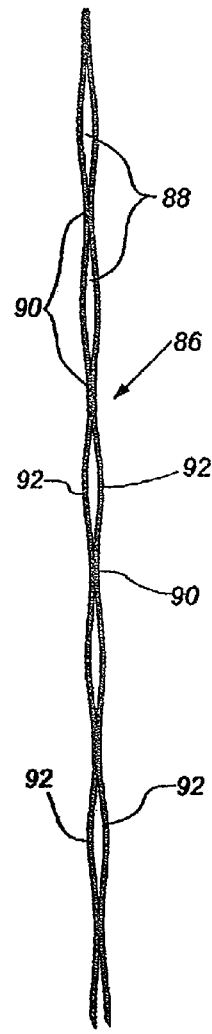
Fig. 21
Fig. 22

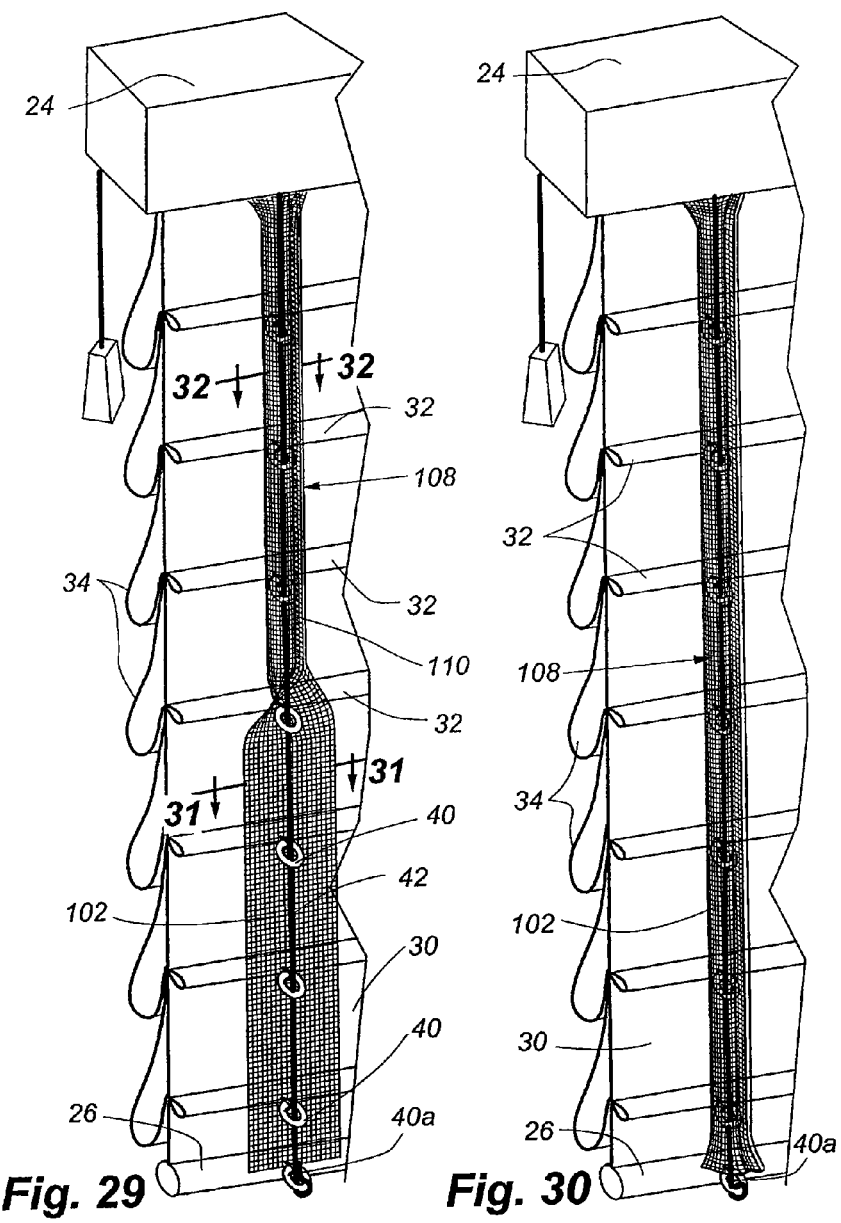

SYSTEM FOR CONFINING LIFT CORDS IN COVERINGS FOR ARCHITECTURAL OPENINGS

CROSS-REFERENCE TO RELATED APPLICATIONS

The present application is a continuation of co-pending U.S. patent application Ser. No. 13/914,168, filed 10 Jun. 2013, which is a continuation of U.S. patent application Ser. No. 13/022,153, filed 7 Feb. 2011, now U.S. Pat. No. 8,474,507, which is a continuation-in-part of International Patent Application No. PCT/US2009/052802, filed 5 Aug. 2009, which claims the benefit under 35 U.S.C. §119(e) to U.S. Provisional Patent Application No. 61/091,049, filed 22 Aug. 2008, and U.S. Provisional Patent Application No. 61/165,777, filed 1 Apr. 2009 ("the '168, '153, '802, '049, and '777 applications"). U.S. patent application Ser. No. 13/022,153, filed 7 Feb. 2011, now U.S. Pat. No. 8,474,507, also is a continuation of International Patent Application No. PCT/US2010/061918, filed 22 Dec. 2010 (the '918 application). The '168, '153, '918, '802, '049 and '777 applications are hereby incorporated by reference into the present application in their entireties.

BACKGROUND OF THE INVENTION

1. Field of the Invention

The present invention relates generally to safety systems for coverings for architectural openings and more particularly to a system for confining lift cords used in retractable coverings for architectural openings so that they cannot form loops in which children or infants can catch a body part thereby causing injury.

2. Description of the Relevant Art

Retractable coverings for architectural openings such as windows, doors, archways and the like, have become commonplace and assume numerous variations for both functional and aesthetic purposes. Such retractable coverings typically include a headrail, in which the working components for the covering are primarily confined, a bottom rail extending parallel to the headrail, and some form of shade material which might be fabric or other manipulative structure such as found in venetian blinds for example, interconnecting the headrail and bottom rail. The shade material is movable with the bottom rail between extended and retracted positions relative to the headrail. In other words, as the bottom rail is lowered or raised relative to the headrail, the fabric or other material is extended away from the headrail or retracted toward the headrail so it can be accumulated either adjacent to or within the headrail. Systems for operating such retractable coverings can assume various forms such as pull cords that hang from one or both ends of the headrail. The pull cords may assume a closed loop or hang linearly. In some instances, the covering is operated remotely with electronics and a motor mounted within the headrail avoiding the need for such pull cords.

Regardless of the mode of operating the covering to move it between extended and retracted positions, many coverings require lift cords extending from the headrail to the bottom rail, which are raised either by gathering the lift cords adjacent to the headrail or rolling the lift cords about a roller in the headrail. The bottom rail can thereby be raised gathering the fabric or other shade material between the headrail and the bottom rail or extended to allow the bottom rail to drop away from the headrail usually by gravity. Such lift cords, while usually being concealed or somewhat concealed or possibly even positioned behind the fabric, are exposed to children or infants and have created a nuisance and threat to the safety of the child or infant.

Until recently, most of the effort to render coverings for architectural openings childproof or safe have focused on the pull cords, which as mentioned above are suspended from the headrail either linearly or in a closed loop, as they are readily exposed to children and therefore sometimes define an attractive nuisance. Many systems have, therefore, been employed to render such pull cords as safe as possible. Those systems have included avoiding the use of closed loops which might easily be wrapped around a child or infant's body part or making tassels that interconnect a plurality of linear pull cords breakaway so that loops in the pull cords are not easily formed.

The possible exposure to child and infant harm inherent in lift cords for such coverings has been recently recognized as a child safety issue and, accordingly, the need for neutralizing such threats has become an issue for the industry.

It is to reduce and hopefully negate the possibility of lift cords causing harm to an infant or child that the present invention has been developed.

SUMMARY OF THE INVENTION

Pursuant to the present invention, danger created from lift cords in a covering for an architectural opening is neutralized by operatively connecting the lift cords to a substantially non-extensible protector with the non-extensible protector being attached to the fabric for the covering so that large loops of the protector cannot be formed and, with the lift cords being confined to the protector, they likewise cannot be made into a large enough loop to cause injury to a child or infant.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 3 is an enlarged fragmentary section showing one edge of the covering as viewed in FIG. 2 in a fully-extended position.

FIG. 4 is a fragmentary isometric similar to FIG. 3 with the covering being partially elevated by forming a loop in the lift cord, which could cause danger to a child or infant.

FIG. 18 is an isometric similar to FIG. 16 showing a small loop having been formed in the lift cord with the protector of the invention incorporated thereon.

FIG. 19 is a fragmentary isometric similar to FIG. 18 showing the covering being partially raised.

FIG. 21 is a rear isometric showing a fifth embodiment of a protector in accordance with the invention mounted on the rear of a covering for an architectural opening.

FIG. 22 is a side elevation of the protector shown in FIG. 21.

FIG. 29 is an isometric similar to FIG. 28 with the strip of mesh material of the protector being formed into a closed tubular configuration to confine the guide rings and the lift cord.

FIG. 30 is a rear isometric similar to FIG. 29 with the strip of mesh material having been completely formed into an enlongated tube on the rear face of the covering.

DETAILED DESCRIPTION OF THE INVENTION

Referring first to FIGS. 1-4, an example of a retractable covering for an architectural opening in which the protector of the present invention would find an application is illustrated. It should be appreciated, the covering shown in FIGS. 1-4 is used for illustrative purposes only while there are many retractable coverings which could find use for the system of the present invention. This system would find use in most any retractable covering wherein exposed lift cords are utilized for reciprocally moving a bottom rail toward and/or away from a head rail for the covering.

Figure 1:
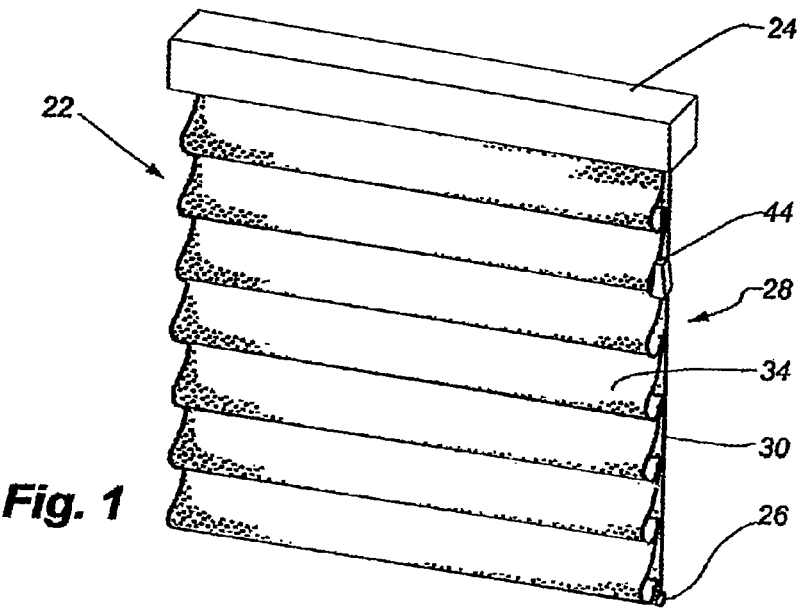
FIG. 1 is a front isometric of a retractable covering for an architectural opening having a headrail, a bottom rail, and a looped fabric extending therebetween and with a plurality of lift cords extended vertically between the headrail and the bottom rail along a rear face of the fabric.

FIG. 1 shows a retractable covering 22 from the front and it will there be seen the covering includes a headrail 24 in which a significant portion of the control system for the covering is concealed, a bottom rail 26, and a flexible shade material 28 in the form of a fabric extending between the headrail and the bottom rail. The fabric has a rear sheet 30, seen best in FIGS. 2-4, which extends continuously from the headrail to the bottom rail and includes rearwardly directed vertically spaced and horizontally extending pleats 32. A front sheet 34 of the fabric is connected as with adhesive, stitching, or the like, to the rear sheet along vertically spaced horizontal lines of connection 36 with a droop or loops of the front sheet being established between each line of connection due to the fact that the amount of material on the front sheet between the lines of connection is greater than the spacing between the lines of connection. The covering, as best appreciated by reference to FIG. 1, therefore resembles a Roman shade.

Figure 2:
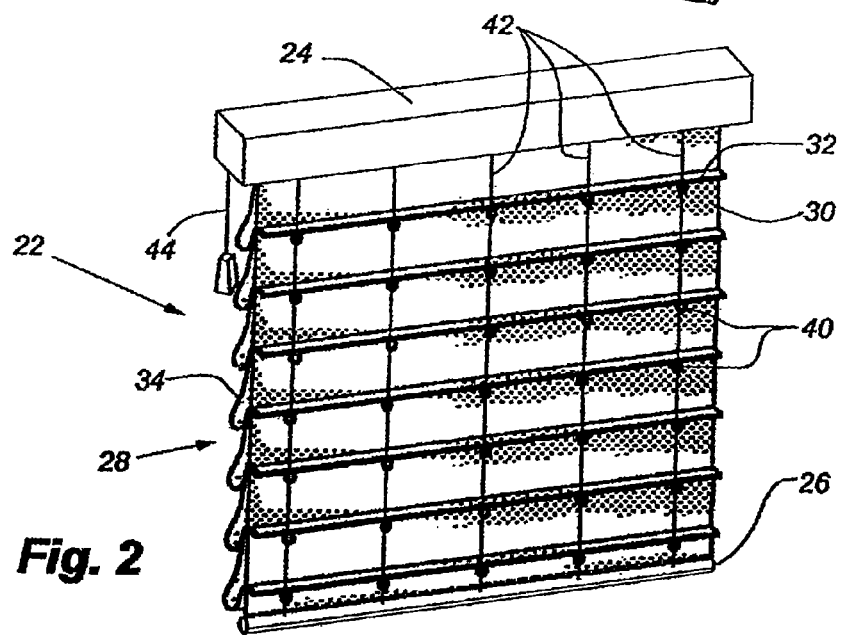
FIG. 2 is a rear isometric of the covering shown in FIG. 1.
Figure 5:
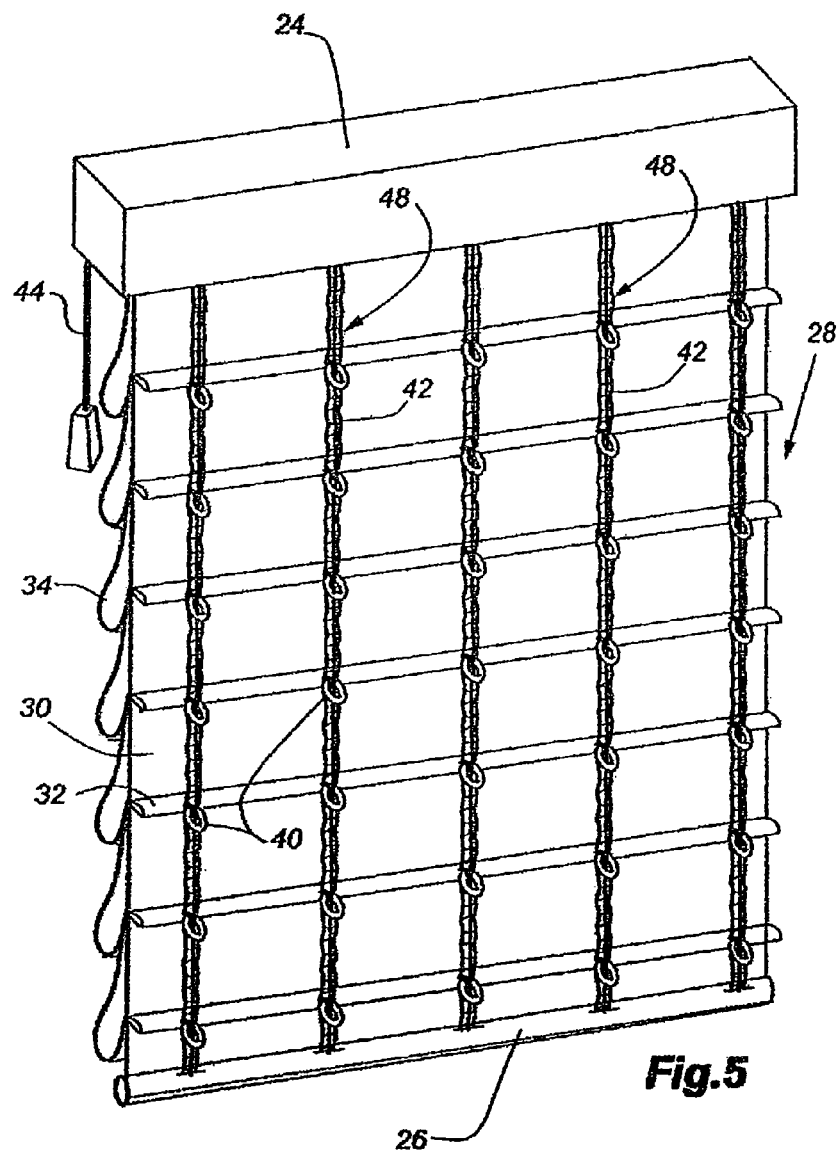
FIG. 5 is an isometric looking at the rear of a retractable covering similar to FIG. 1 incorporating a first embodiment of a protector for the lift cords across the rear face thereof.

A plurality of primary guide rings 40 are secured as with threads, adhesive, or the like to each pleat 32 on the rear sheet 30 to define vertical columns of the guide rings. The vertical alignment of the guide rings in each column provides a passage for vertically extending lift cords 42, which are anchored at their lower end to the bottom rail 26 and at their top end in the headrail 24 to a roller (not seen) or other system whereby the lift cords can be retracted into the headrail to shorten their effective length thereby raising the bottom rail as desired. Of course, unrolling the lift cords from the roller allows the effective length thereof to be extended and consequently the bottom rail to be lowered when the covering is moved from a retracted position with the bottom rail adjacent to the headrail to an extended position as shown in FIGS. 1-3. The lift cords form part of the control system for the covering and are raised and lowered with a pull cord 44 in a conventional manner. A conventional pull cord lock (not seen) permits the pull cord to be releasably positioned at any desired position to releasably secure the covering in a partially extended or retracted position. When the covering is retracted with the bottom rail adjacent to the headrail, the fabric 28 is gathered between the bottom rail and the headrail with FIG. 4 showing a partial gathering thereof.

FIG. 4 is primarily included to illustrate how a loop 46 of lift cord can be formed off the rear of such a covering with the loop being large enough to encapsulate a body part of an infant or child. The loop can be intentionally or unintentionally formed by grabbing a lift cord 42 and pulling it laterally, which thereby causes the bottom rail 26 to elevate, as a loop of significant size is formed. It is a loop 46 of this size in a lift cord which can be avoided through the present invention as will be explained hereafter.

Referring next to FIGS. 5-9, a first embodiment of a system for preventing an enlarged loop as shown in FIG. 4 from being intentionally or inadvertently formed in a lift cord 42 is illustrated. The essence of the invention resides in providing a flexible, non-extensible protector 48 associated with each lift cord with the protector being secured to the fabric 28 at vertically spaced locations and with the spacing of such locations being insufficient to form a loop in the protector of sufficient size to cause damage to an infant or child. The protector in turn is operatively associated with a lift cord so that a loop could also not be formed in the lift cord of a size sufficient to cause injury to a child or infant.

In the embodiment of FIGS. 5-9, the protector 48 is a miniturized cord ladder. Cord ladders are commonly used in venetian blinds (not shown) to support, raise and tilt horizontal slats in the blind. The cord ladder 48 has a pair of substantially vertically extending elongated flexible side runs 50, which are interconnected by substantially horizontally extending flexible rungs 52, at locations spaced along the length of the side runs. The runs and rungs are all formed from flexible cord-like material establishing an open ladder-type element that is elongated and can extend from a connection in the headrail 24 of the covering to a connection to the bottom rail 26 while having a lift cord 42 (FIG. 6) woven in and out of the rungs thereof while being partially exposed.

Figure 6:
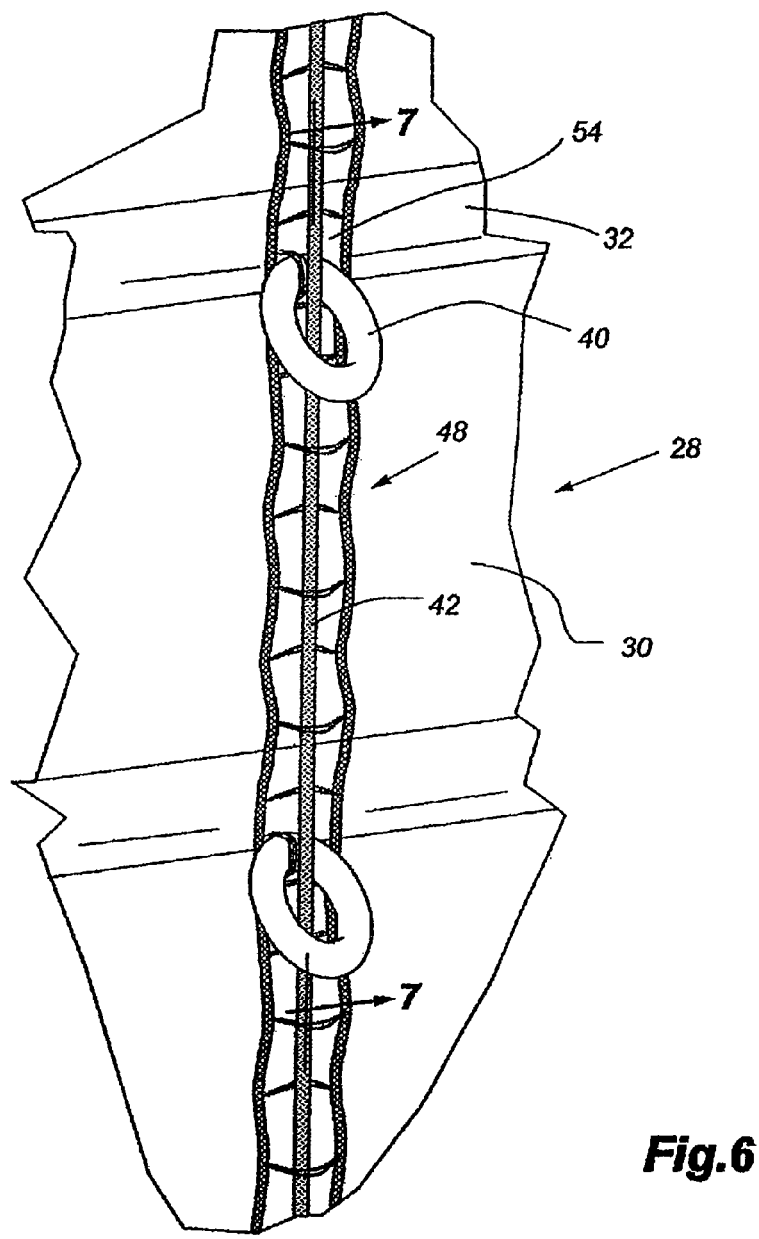
FIG. 6 is a further enlarged fragmentary isometric looking at the rear of a covering of the type shown in FIGS. 1-5 with a first embodiment of the protector of the present invention shown in operative relationship with a lift cord.

As best appreciated by reference to FIG. 6, each guide ring 40 secured to a pleat 32 in the rear sheet 30 of the fabric 28 is inserted through a space 54 in the cord ladder or protector 48 between adjacent rungs 52 and the longitudinal side runs 50 with that space being slightly smaller than the diameter of a guide ring in a neutral orientation. The flexibility of the runs and rungs, however, allow the cord ladder to be stretched over a guide ring and into a position in which the cord ladder is not easily removed from a guide ring. The guide rings therefore hold the cord ladder in position at each location of a guide ring and therefore secure it to the fabric at those locations. The cord ladder is attached to the guide rings so that it extends in a non-looped orientation between guide rings when the covering is extended whereby a fixed length of cord ladder is established between each guide ring. That fixed length of the cord ladder is sufficient to allow the fabric for the covering to be fully extended as shown, for example, in FIG. 5.

The cord ladder 48, as mentioned, is also positioned relative to an associated lift cord 42 so that the lift cord is slideably woven in and out of the rungs 52 (FIG. 6) with the lift cord extending behind one rung and in front of the next adjacent rungs. In this manner, the lift cords are each positively and operatively connected to the cord ladder with the cord ladder being similarly operatively connected to the fabric 28 via the connection with the guide rings 40. It should be appreciated that even if a ring were to inadvertently pop out of a space 54, the rungs of the ladder above and below the ring would retain the ladder adjacent to the ring by the interference of the lift cord which is routed through the ring. As also seen in FIG. 6, the lift cords also pass slidably through each guide ring so they are held in closely adjacent relationship to the fabric for reliable operation of the covering.

Figure 7:
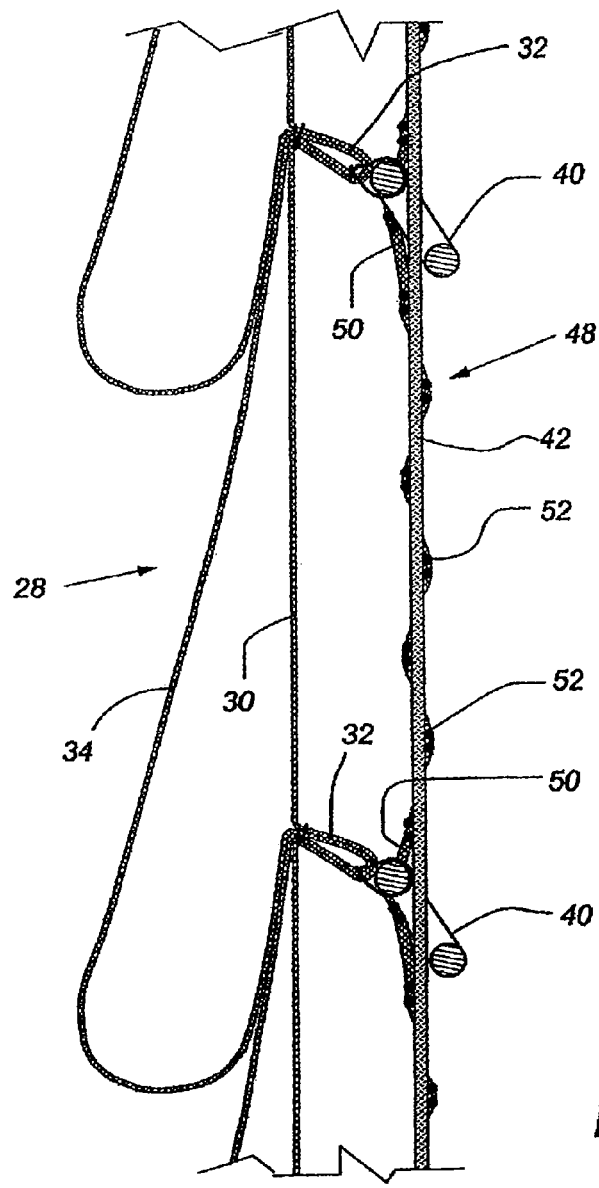
FIG. 7 is a fragmentary vertical section taken along line 7-7 of FIG. 6.

FIG. 7 is a side view showing the relationship of the front 34 and rear 32 sheets of the fabric, the guide rings 40, the cord ladders 48 and the lift cord 42 as seen in isometric in FIG. 6.

Figure 8:
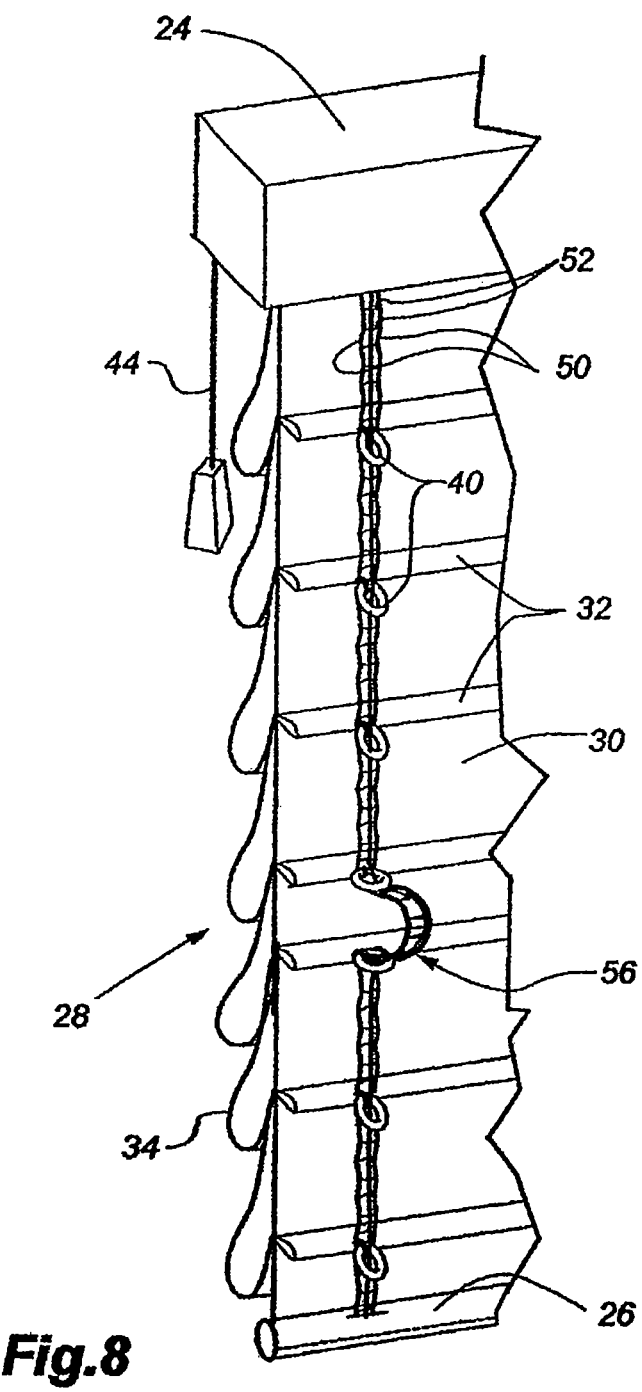
FIG. 8 is an isometric similar to FIG. 4 with the protector of FIGS. 6 and 7 incorporated therein and showing a relatively small loop in the lift cord formed off the rear of the covering.
Figure 9:
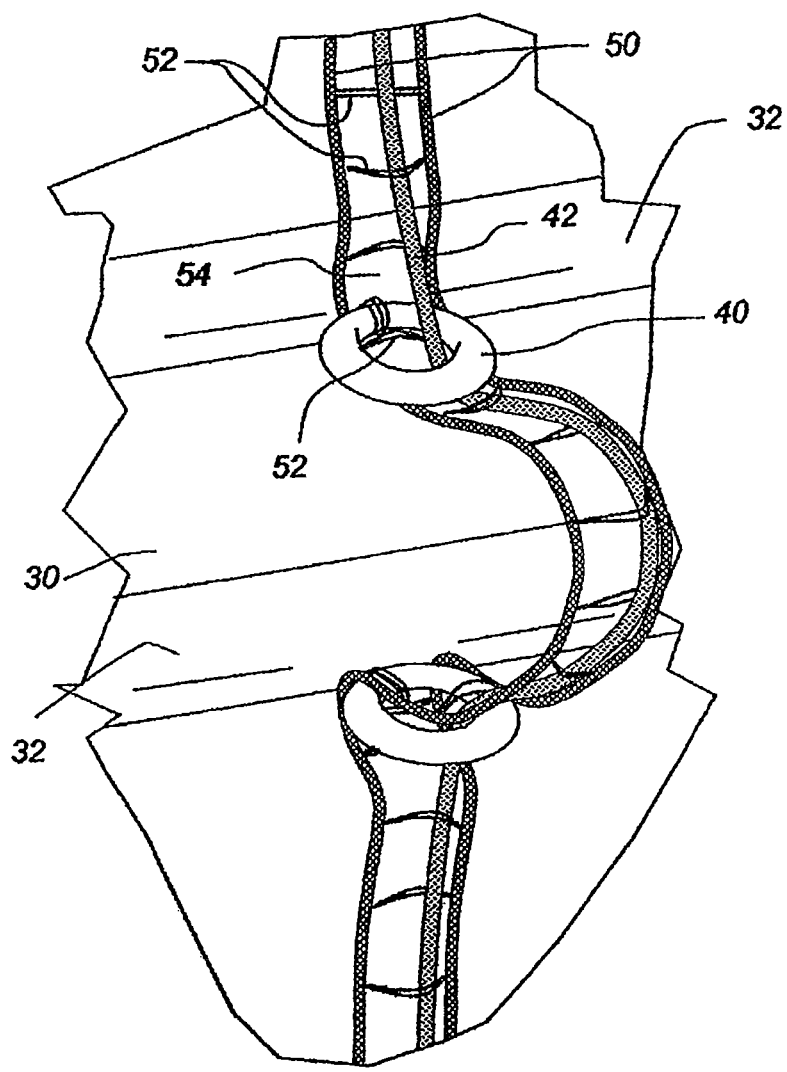
FIG. 9 is a further enlarged fragmentary isometric showing the loop formed in FIG. 8.

Referring to FIG. 8, a loop 56 has been formed in a lift cord 42 as well as the protector cord ladder 48 in which it is confined off the rear face of the fabric 28. As will be appreciated, the size of the loop 56 will be limited to the spacing of the adjacent guide rings 40 and the length of cord ladder 48 extending therebetween. As mentioned previously, the length of cord ladder extending between adjacent guide rings is fixed so that the loop 56 formed, as shown in FIG. 8, has a maximum predetermined size which is known to be smaller than that which would be necessary to endanger a child or infant by encapsulating a body part. The loop is shown in greater detail in the enlarged isometric of FIG. 9. As can be appreciated, the fixed length of the cord ladder between adjacent guide rings only permits the relatively small loop 56 to be formed which elevates the bottom rail 26 a small distance but cannot elevate the bottom rail any greater distance, such as shown in FIG. 4, due to the operative relationship between the cord ladder, the guide rings and the lift cord.

Figure 10:
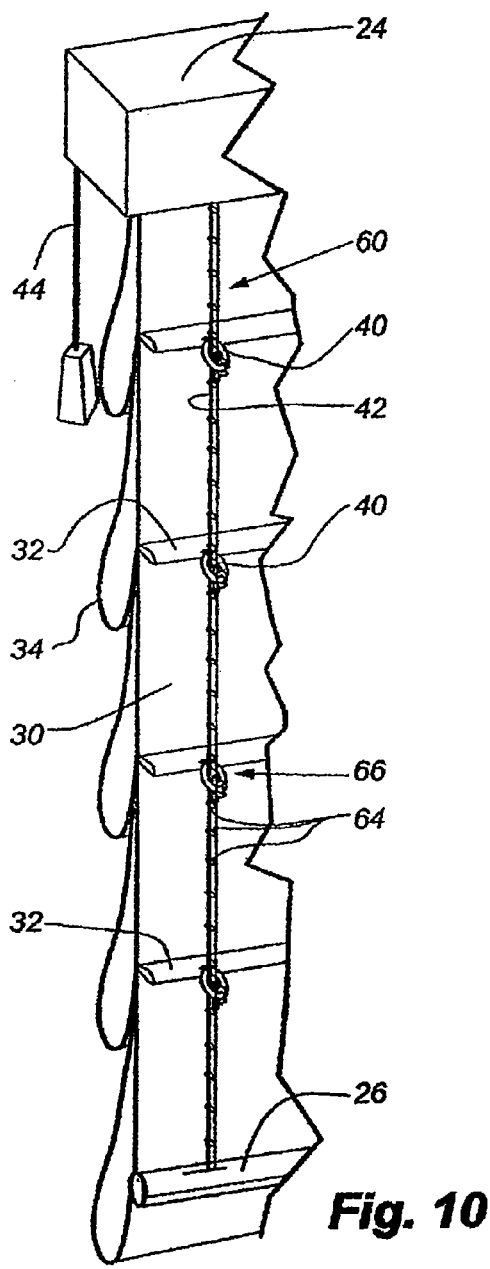
FIG. 10 is a fragmentary rear isometric showing a second embodiment of a protector in accordance with the invention.
Figure 11:
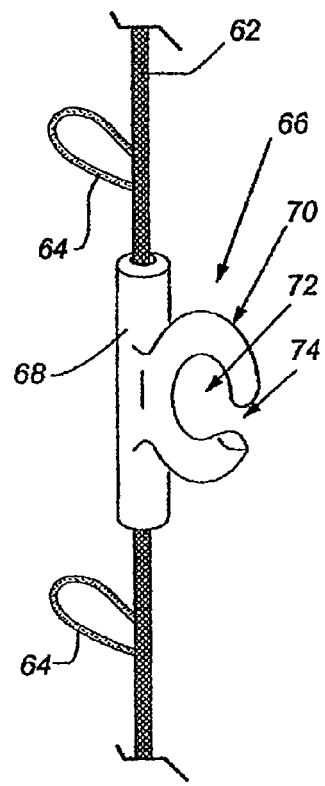
FIG. 11 is an enlarged fragmentary isometric of a portion of the protector used in the embodiment of FIG. 10.
Figure 12:
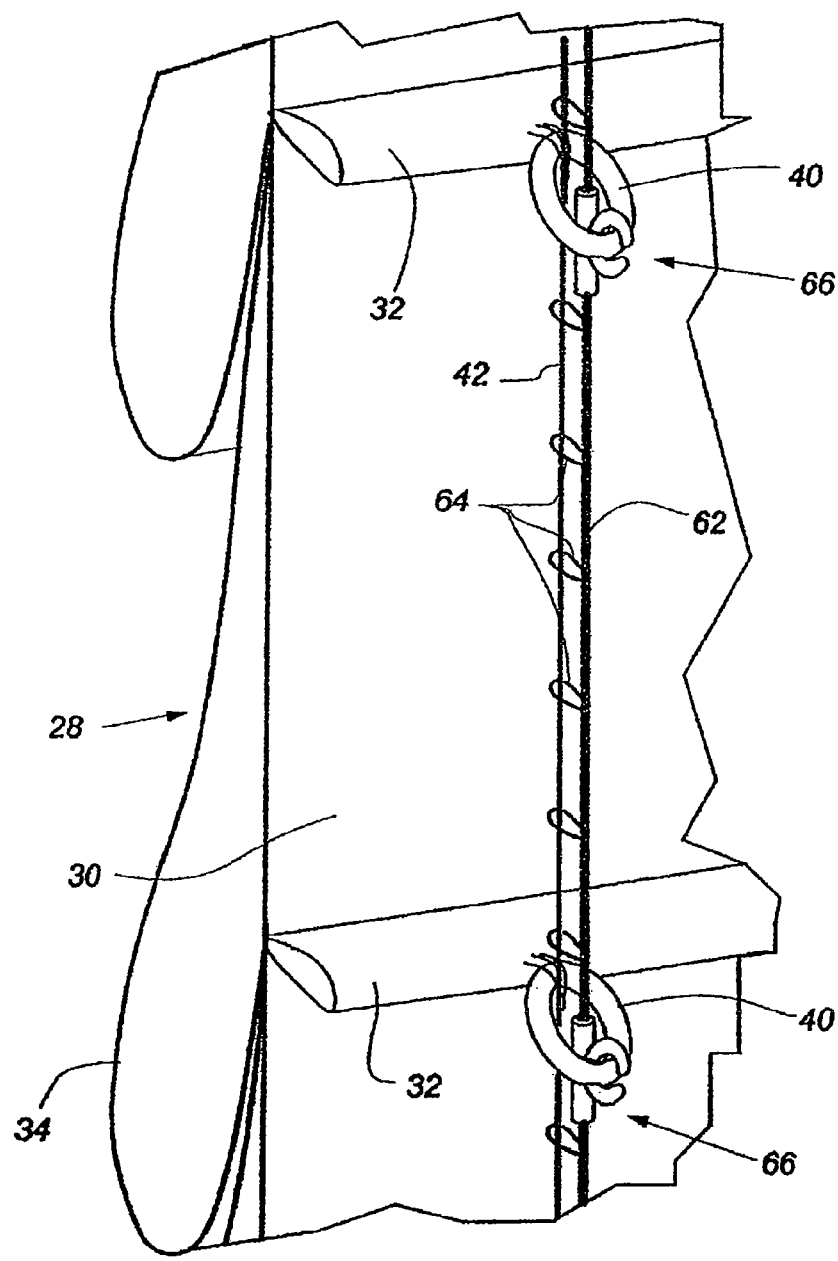
FIG. 12 is a further enlarged rear isometric of the embodiment as shown in FIG. 10.

A second embodiment of a protector in accordance with the present invention is shown in FIGS. 10-12. In this embodiment, illustrated in connection with the same covering as shown in FIGS. 1-4, the protector 60 is in the form of an elongated flexible base cord 62 having a plurality of flexible loops of cord 64, secondary guide rings, or the like, formed thereon with the loops of cord being equally spaced along the length of the base cord so as to define an open structure. The loops are flexible and provide a similar guide function as primary guide rings 40, yet are less rigid. Also, at fixed locations along the length of the base cord, a somewhat resilient clip 66 is positioned on the main cord 62 which might be fixed to the main cord in any predetermined way such as by crimping, adhesive, molding or the like. Each clip has an elongated sleeve 68 for receiving the base cord and a C-shaped clasp 70 extending laterally from the sleeve adapted to releasably grip a primary guide ring 40. In other words, the C-shaped clasp has a circular passage 72 therethrough which is slightly larger than a transverse section through a portion of a guide ring while an open neck entry 74 into the passage has a dimension slightly smaller than the cross-section of a guide ring which permits the guide ring to be forced therethrough due to the resiliency of the material from which the clasp is made. As will be appreciated by reference to FIG. 12, each guide ring is therefore connected to a clip which is positively positioned along the length of the protector cord 60 so that the protector cord cannot move to any significant degree relative to a guide ring. A fixed length of protector cord, substantially equivalent to the spacing between adjacent guide rings on the fabric, is therefore established between each guide ring similarly to the fixed length of cord ladder in the embodiment of FIGS. 5-9. In this embodiment, a lift cord 42 associated with a protector cord is slideably threaded through the cord loops 64 formed off the base cord 62 so that the lift cord is slideably confined to the base cord but partially exposed along its length. In this manner, the size of a loop that could be formed in the protector cord and the lift cord operatively associated therewith is of a limited size and of a size that is predetermined so that any such loop could not encapture a body part of a child or infant and therefore causes harm.

Figure 13:
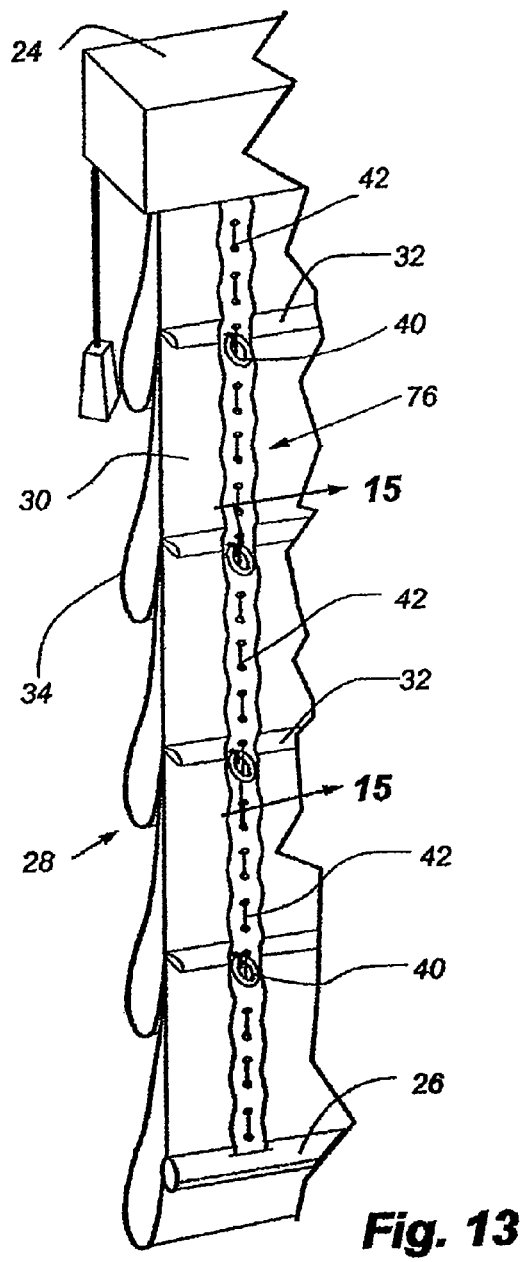
FIG. 13 is a fragmentary rear isometric showing a third embodiment of a protector in accordance with the invention.
Figure 14:
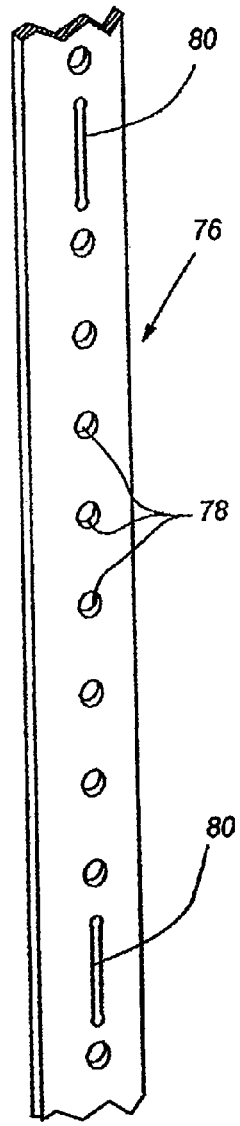
FIG. 14 is an isometric of a tape serving as the protector for the embodiment of FIG. 13.
Figure 15:
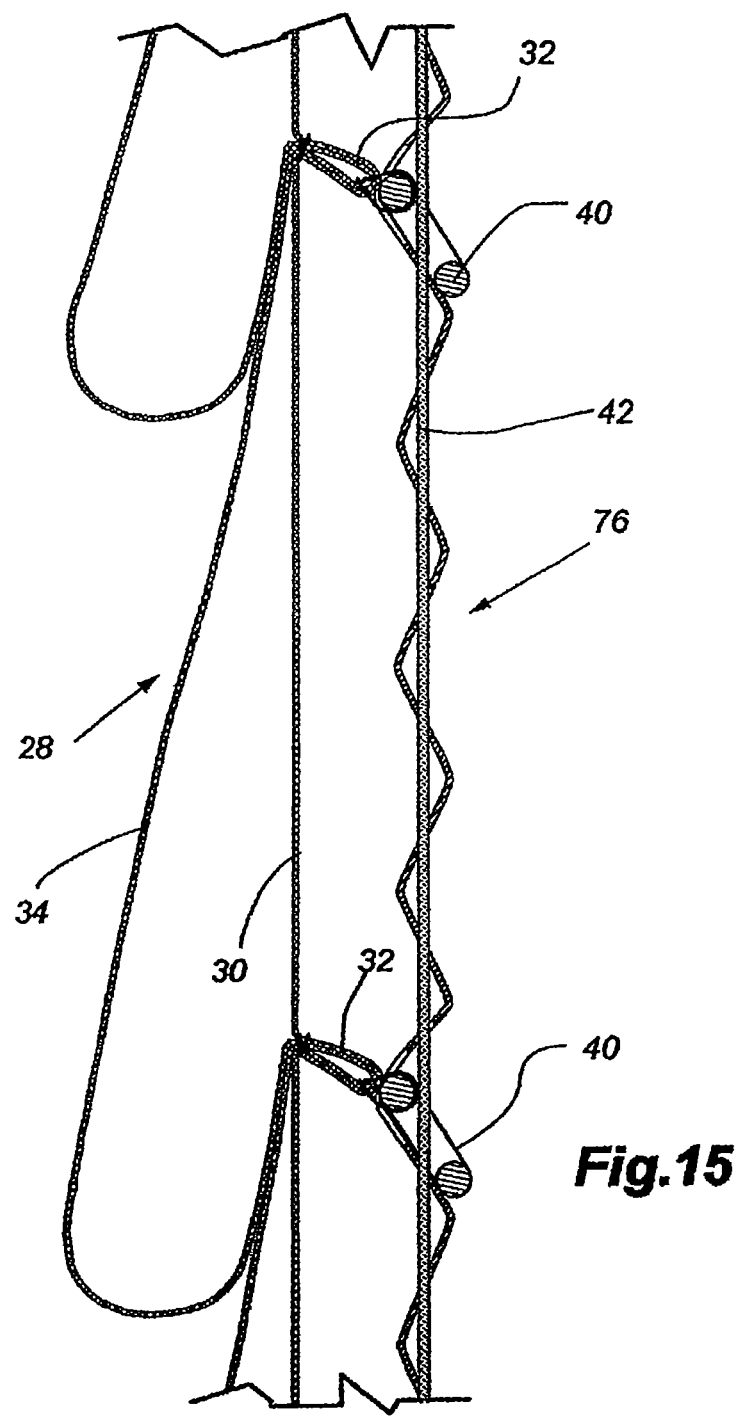
FIG. 15 is a side elevation of the embodiment of FIG. 13.
Figure 16:
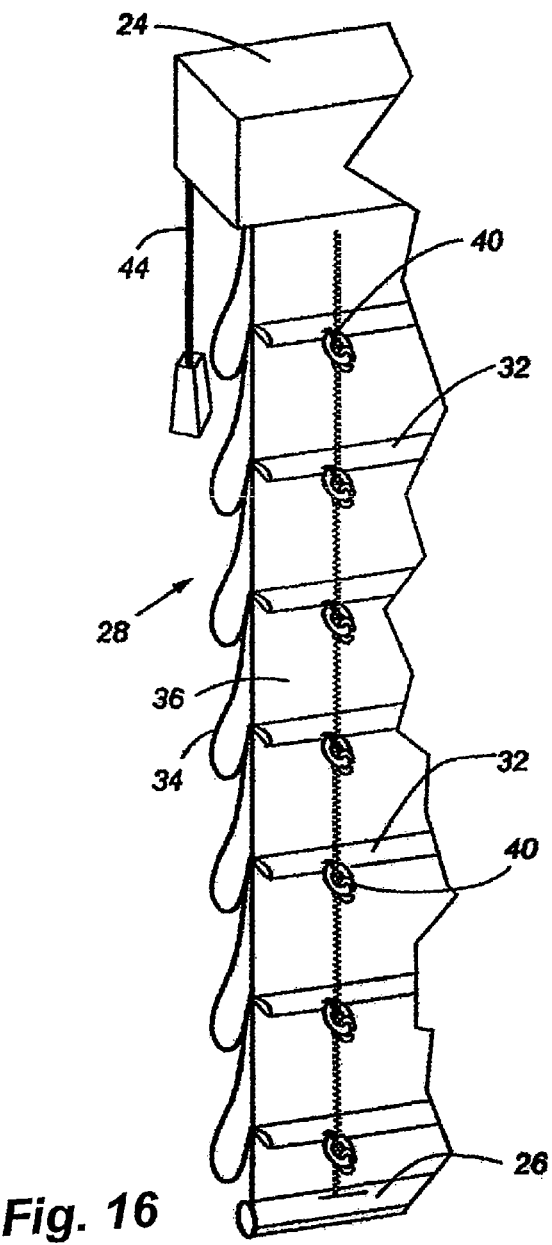
FIG. 16 is fragmentary rear isometric showing a fourth embodiment of a protector in accordance with the invention.

A third embodiment of the present invention is shown in FIGS. 13-15 with the embodiment again being mounted on a covering having a headrail 24, a bottom rail 26, and a fabric 28 extending therebetween. The fabric has a rear sheet 30 and a looped front sheet 34. Pleats 32 are again formed in the rear sheet having guide rings secured thereto with the guide rings 40 normally assuming a non-vertical orientation as seen in FIGS. 13 and 15.

In this embodiment of the invention, the protector 76 is an elongated flexible tape or ribbon which could be of any suitable materials such as fabric, flexible plastic, a rubberized material or the like. The tape or ribbon 76 as seen best in FIG. 14 is elongated and thin in dimension so as to be flexible and will readily buckle transversely when the covering is moved from an extended to a retracted position. The tape, of course, is secured within the headrail 24 at a top end and to the bottom rail 26 at a bottom end and has a plurality of equally spaced, vertically aligned circular apertures or openings 78 therethrough which are interspersed at periodic intervals with elongated vertical slots 80. The elongated slots are adapted to receive a guide ring 40 when the guide ring is twisted into a vertical orientation and when the guide ring resumes its neutral position, which is non vertical, the ring releasably secures the tape to the rear side of the fabric 28. The lift cord 42 is threaded through the tape as illustrated in FIGS. 13 and 15 so as to be partially exposed and so that it will slide longitudinally of the tape. When the effective length of the lift cord is shortened to raise the covering from an extended to a retracted position, the lift cord of course raises the bottom rail toward the headrail causing the fabric and the protector tape to gather therebetween. As in the prior two embodiments, due to the fact that the protector is secured to the fabric at spaced locations identified by the guide rings, the length of the protector between adjacent guide rings is fixed. It would, therefore, be very difficult for a loop to be formed in the lift cord greater than that permitted by the fixed length of tape between adjacent guide rings. In this manner, a loop cannot be made large enough to encapsulate a body part of an infant or child.

A fourth embodiment of the present invention is shown in FIGS. 16-20 with this embodiment again being illustrated in conjunction with a covering having a headrail 24, a bottom rail 26, and a fabric 28 extending therebetween with the fabric including a rear pleated sheet of material 30 and a front looped sheet of material 34. Guide rings 40 are again secured to the pleats in vertical alignment at a plurality of locations aligned with lift cords 42 provided in the covering.

Figure 17:
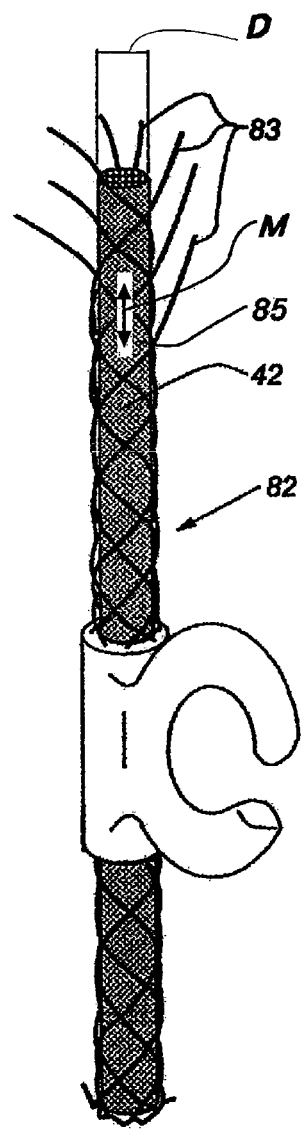
FIG. 17 is a fragmentary isometric of a lift cord encompassed by the protector of FIG. 16.
Figure 20:
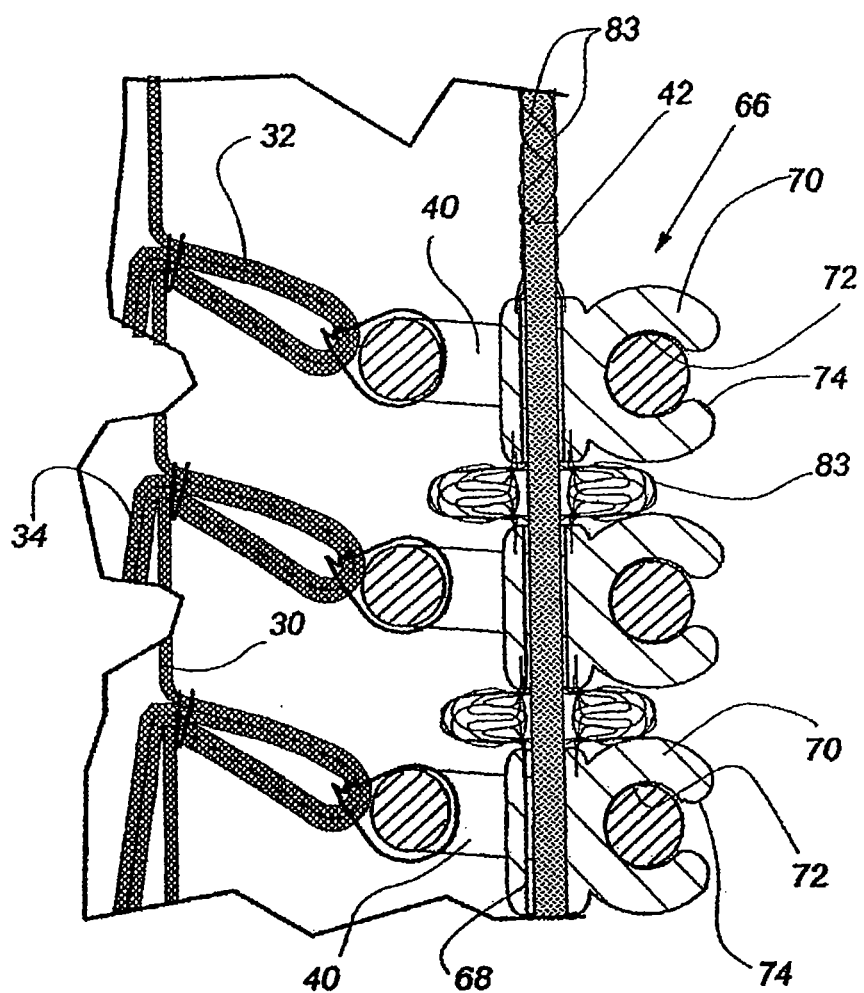
FIG. 20 is an enlarged section taken along line 20-20 of FIG. 19.

The protector 82 in the fourth embodiment comprises an elongated spirally woven open sheath formed from a plurality of nylon or other fibers or sheath cords 83 which constrict in transverse cross section when stretched longitudinally or transversely as in a well known "Chinese finger cuff." The sheath cords 83 weave around the lift cord 42 and intersect regularly. The intersecting sheath cords 83 define interstitial regions 85 generally forming four-sided shapes that may include squares, rectangles, diamonds, or the like, and define an area. The interstitial regions have a major linear dimension "M" (see FIG. 17) that may be between opposite corners, opposite sides, or a mix thereof. The major dimension M for each interstitial region may differ from the major dimension of other interstitial regions. Given the nature of the weave, the area and major dimension M of each interstitial region changes when the weave is stretched, with the change in area and length, respectively, typically being a decrease in size. The lift cord 42 has a nominal diameter "D" (including a major dimension if not circular) (see FIG. 17), and resulting cross-sectional area, that the lift cord may not fit through at least one of the interstitial area, and is thus retained in the protector 82. For instance, the diameter D of the lift cord may be equal to or larger than the major dimension M of the interstitial region 85, or the cross-sectional area of the lift cord may be equal to or larger than the area of the interstitial region 85. The sheath surrounds a lift cord 42 as shown in FIG. 17 while leaving it exposed and includes a plurality of somewhat resilient C-clips 66 of the type shown in the embodiment of FIGS. 10-12. Each sleeve 68 of a C-clip is secured in position along the length of the lift cord and sheath with adhesive, crimping, molding, or in any other suitable manner. The preferred way of securing a C-clip to the sheath is by injection molding a resilient plastic around the sheath while maintaining a hollow core in the sheath so that the lift cord can still pass unobstructively through the C-clip. Each C-clip, as described previously, has a C-shaped clasp 70 having a circular passage 72 therethrough adapted to receive a guide ring 40 with an open neck 74 communicating with the circular passage that is slightly smaller than the transverse cross section of a guide ring so that the guide ring can be snapped into the clasp due to its resiliency. In this manner, the lift cord with the sheath surrounding it along its entire length can be threaded through the guide rings with the C-clips being attached to an associated guide ring thereby defining a fixed length of sheath between adjacent guide rings. The lift cord is axially slidable within the sheath to move the bottom rail toward or away from the headrail and when the bottom rail is being moved toward the headrail, the sheath is collapsed (FIGS. 19 and 20) along each segment between C-clips thereby even expanding in transverse cross section to permit easy sliding movement of the lift cord therethrough.

When a lift cord with the surrounding sheath is pulled laterally away from the fabric (FIG. 18) to form a loop 84, however, the sheath will grip the lift cord so the lift cord cannot form a larger loop than the sheath between guide rings 40. Since the length of the sheath between guide rings is fixed and is insufficient to form a large enough loop to encapsulate a body part of an infant or child, the lift cord likewise cannot form such a loop.

A fifth embodiment of a protector in accordance with the present invention is shown in FIGS. 21 and 22. This embodiment 86 of the protector is shown in FIG. 21 incorporated into a covering of the type shown in FIGS. 1-4 and, accordingly, like parts of the covering have been given like reference numerals.

The protector 86 itself is simply an elongated flexible cord of the type used in coverings for architectural openings as pull cords, lift cords or the like, but has been woven in a unique manner to define open pockets or gaps 88 sized to permit a guide ring 40 to be snuggly fitted therethrough to secure the protector to the fabric 28 for the covering. Referring first to FIG. 22, the protector can be seen to be an elongated flexible cord which is unitary at spaced locations 90 along the length of the protector and then is bifurcated into two parallel legs 92 between adjacent unitary segments. Where the cord is bifurcated, it forms the open pocket or gap 88 through which the guide ring can be inserted by orienting the guide ring vertically and then when the guide ring resumes its neutral more horizontal disposition, it locks the protector 86 to the fabric. In other words, the protector thereby becomes secured to the fabric at spaced locations corresponding to the locations of the guide rings on the fabric so that a fixed length of the protector extends between guide rings as in the prior embodiments. The lift cord 42 is then woven through the gaps in the protector so that it is exposed and slides axially relative to the protector, but as in the prior embodiments, the protector prevents loops larger than a predetermined size from being formed in the lift cord either intentionally or inadvertently due to the fact that the protector, to which the lift cord is operatively associated, is of a fixed length between guide rings with that fixed length being insufficient to form a loop larger than the predetermined size.

Figures 23, 24, 25:
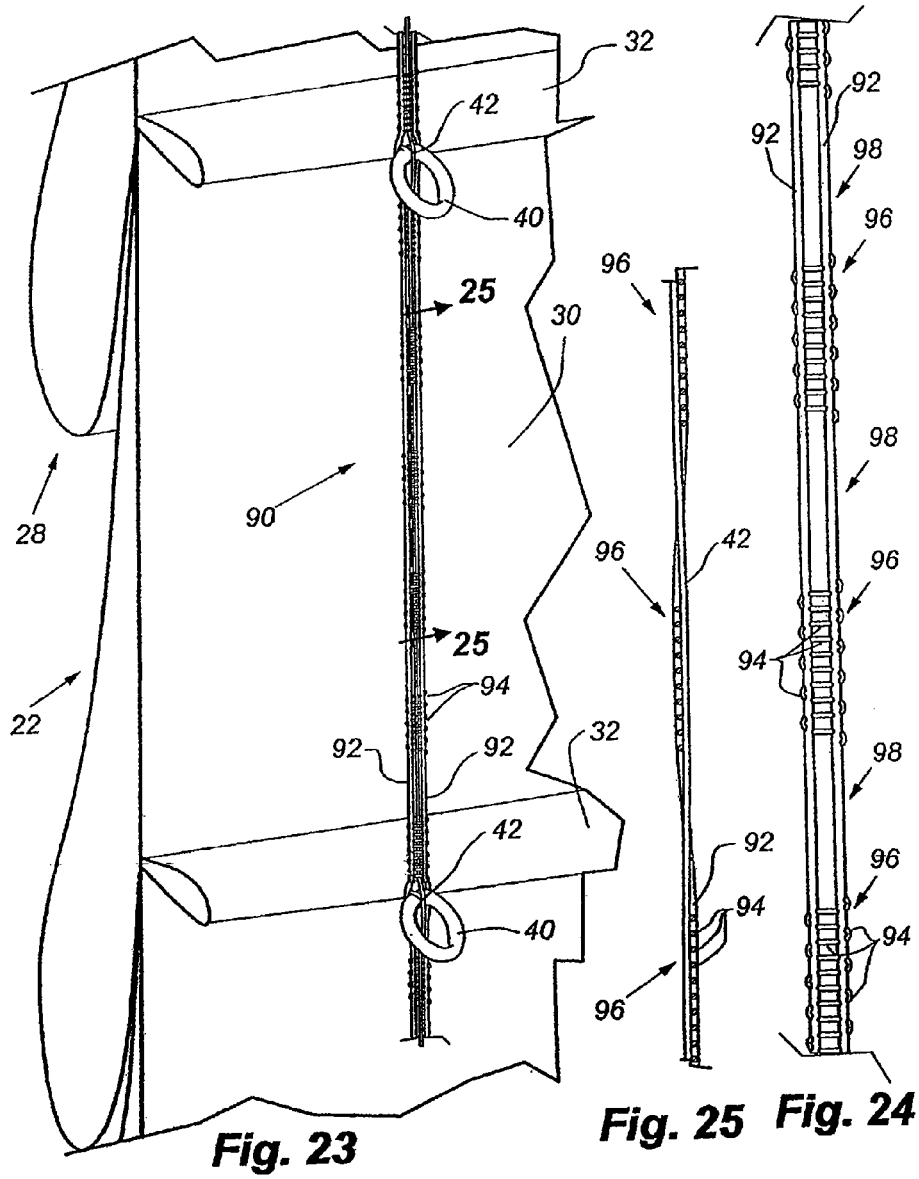
FIG. 23 is a rear isometric showing a sixth embodiment of a protector in accordance with the invention mounted on the rear of a covering for an architectural opening.
FIG. 24 is a front elevation of the protector shown in FIG. 23.
FIG. 25 is a side elevation of the protector shown in FIG. 23.

A sixth embodiment of the protector in accordance with the present invention is shown in FIGS. 23 and 24. This embodiment 90 of the protector is shown in FIG. 23 incorporated into a covering of the type shown in FIGS. 1-4 and accordingly, like parts of the covering have been given like reference numerals.

The protector 90 itself is comprised of a pair of flexible main cords 92 of the type that might be conventionally used as lift cords or pull cords in a covering for architectural openings with the cords being positioned in spaced parallel side-by-side relationship and being integrated or tied together at longitudinally spaced locations by loose stitching with cross cords 94 of a similar material to the main cords but being of approximately half the diameter of the main cords. In other words, the cross cords, which tie the main cords together, extend transversely, as by sewing, from one main cord to the opposite main cord and then back in reversing directions similar to shoe lacing with both ends of the cross cords being secured to one or both of the main cords. Elongated zones of stitching 96 extending between the main cords are spaced from adjacent zones of stitching so that longitudinally-extending spaces 98 between the main cords are defined between the stitched zones 96. By way of example, the stitched zones may be approximately the same length as the longitudinal spaces 98 between the zones defining an open structured protector.

While the cross cords obviously are flexible so they can reverse directions, due to their short lengths between the main cords, they resist buckling and therefore maintain a predetermined spacing between the main cords. Also, where the cross cords pass through a main cord, they resist sliding movement due to friction so they stay in position while holding the predetermined spacing between the main cords.

The protector 90 is attached to the covering 22 for the architectural opening by inserting the guide rings described previously on the back of the covering through one of the longitudinal spaces in the protector so that the protector is removably positioned on the rear side of the covering. Between guide rings there is a plurality of the longitudinally spaced spaces so that the lift cord, which is conventionally passed through the guide rings, is openly woven through the longitudinal spaces as best seen in FIG. 25 thereby openly confining the lift cord between rings to prevent large loops in the lift cord from being formed.

A seventh embodiment of the protector in accordance with the present invention is shown in FIGS. 26-32. The embodiment 100 of the protector is shown in FIG. 30 incorporated onto the rear face of a covering of the type shown in FIGS. 1-4 and, accordingly, like parts of the covering have been given like reference numerals.

Figure 26:
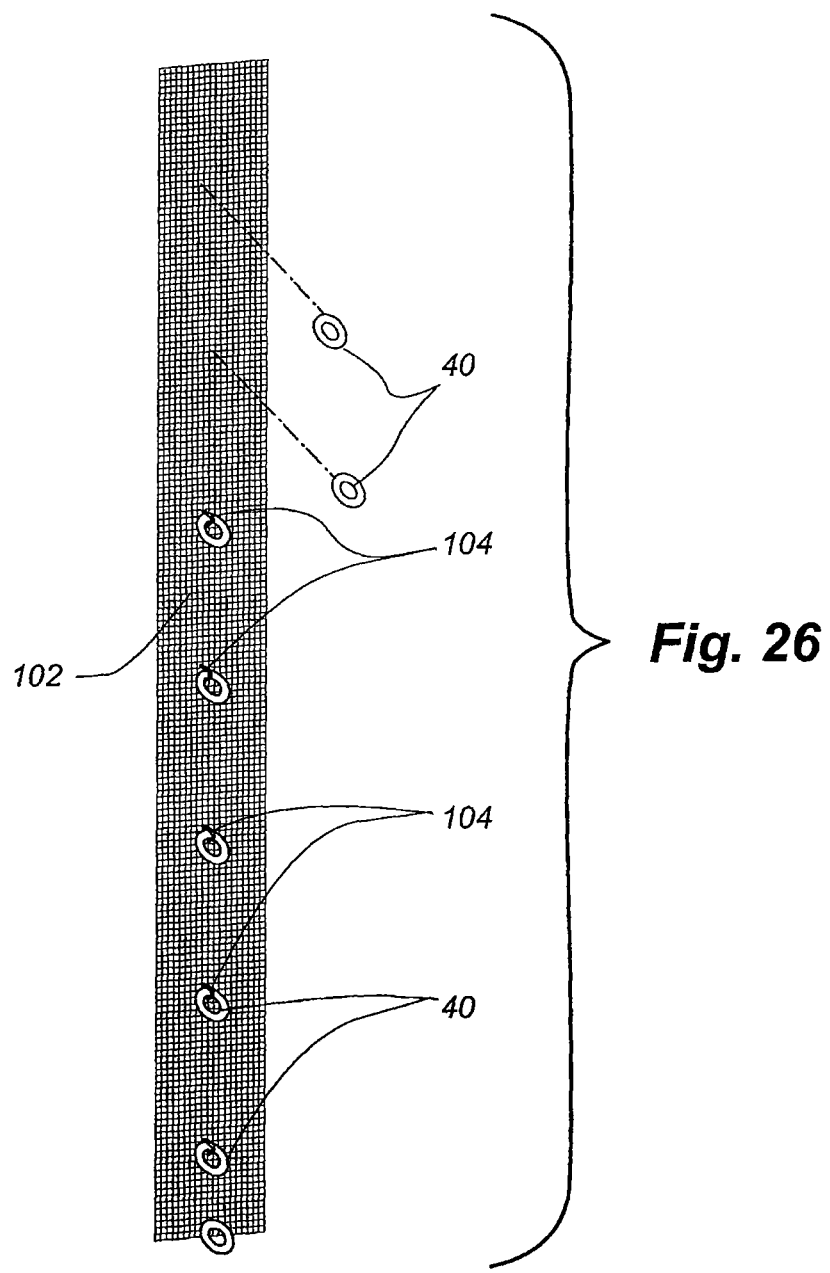
FIG. 26 is an isometric of a seventh embodiment of a protector in accordance with the present invention showing guide rings secured to and being secured to a strip of mesh material.
Figures 27, 28:
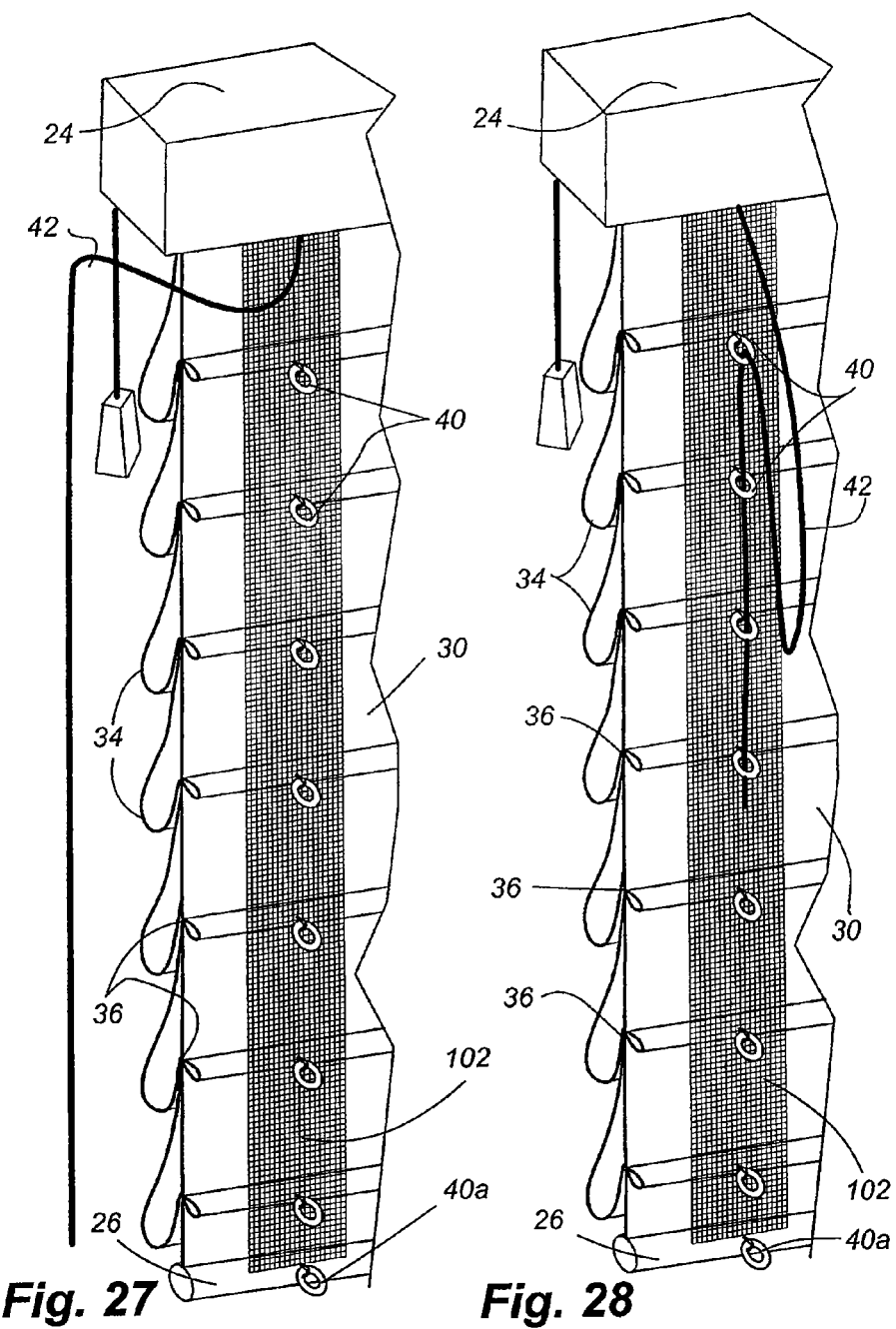
FIG. 27 is a fragmentary rear isometric of a covering for an architectural opening having the protector as illustrated in FIG. 6 secured to the rear surface thereof.
FIG. 28 is an isometric similar to FIG. 27 with a lift cord being strung through guide rings on the protector shown in FIG. 27.
Figure 31:
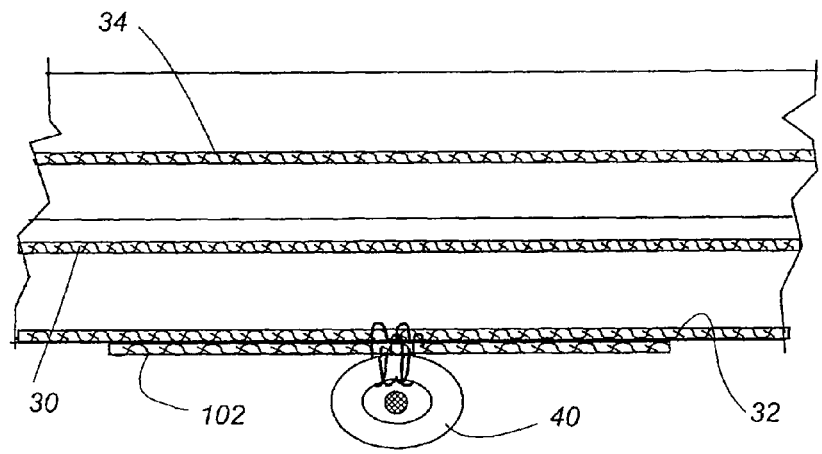
FIG. 31 is an enlarged section taken along line 31-31 of FIG. 29.
Figure 32:
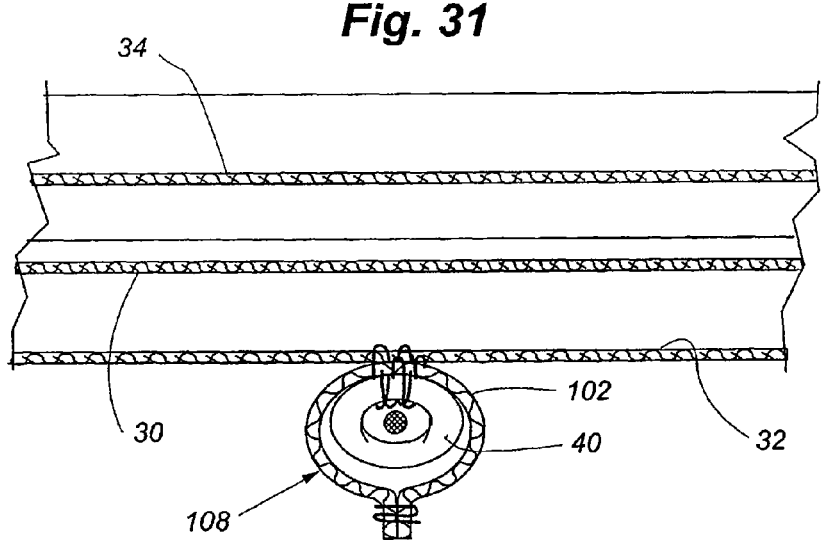
FIG. 32 is an enlarged section taken along line 32-32 of FIG. 29.

The protector 100 is comprised of a strip of mesh material 102 that is either inextensible or substantially inextensible and which is equal in length to the drop or length of the shade material 30 from top to bottom. The strip is cut to a suitable width, which might be for example between 1.5 inches and 2 inches wide. A plurality of guide rings 40 are sewn or otherwise secured to the mesh material 102, as shown in FIG. 26, at predetermined spacings along the length of the strip with the spacing of the guide rings being equivalent to the vertical spacing of the horizontal lines of connection 36, which of course equates to the vertical height of a droop or loop 34 of the front sheet of material in the covering fabric and to the spacing between pleats 32. The strip of mesh material is then secured to the rear sheet 30, as shown in FIGS. 27 and 31, by connecting the rings and the mesh material to the pleats 32. The connection of the guide rings and mesh material can be made to the pleats as in the previously described embodiments such as with stitching 104 (FIG. 26) or other suitable means.

Lift cords 42 can then be threaded, as seen in FIG. 28, from the headrail 24 or top of the fabric material 30 downwardly through the guide rings 40 so that the bottom of the lift cord can be secured to a guide ring 40*a* on the bottom rail 26 of the covering so that each lift cord is confined within a set of vertically spaced guide rings and immediately adjacent to the mesh material 102. Finally, the mesh material, which has opposed vertical side edges 106 is then formed into a closed vertically extending tube 108 by moving the side edges of the mesh material toward each other, as seen in FIG. 29, so that they overlap and are secured together by stitching 110 (FIG. 29), heat welding, or any other suitable means.

In this manner, a vertical protector 100 in the form of a tube 108 of mesh material 102, as seen in FIG. 30, having guide rings 40 internally thereof through which lift cords 42 are extended, completely confines the lift cord along the entire vertical extent of the shade fabric.

In all of the aforenoted embodiments of the protector of the present invention, it has been described in association with a fabric having guide rings attached to the fabric which can be used to connect the protector to the fabric. It should be appreciated the protector can be attached to the fabric or other covering in any suitable fashion. For example, if the covering had a plurality of horizontally oriented vertically spaced rigid slats or battens, clips or brackets could be secured to the slats or battens to which the protector could be connected.

It will be appreciated from the above that a system for preventing a loop from being formed in a lift cord larger that a predetermined size has been described. That system includes the use of protectors that are operatively associated with the lift cords and have fixed lengths between vertically spaced attachments to the fabric of the covering so that the size of any loop being formed in the lift cord, and consequently the protector operatively associated therewith, is limited by the spacing between the locations where the protector is secured to the fabric of the covering. In this manner, large loops cannot be intentionally or unintentionally formed in the lift cord which might pose a danger in encapsulating an infant or child's body part.

Although the present invention has been described with a certain degree of particularity, it is understood the disclosure has been made by way of example, and changes in detail or structure may be made without departing from the spirit of the invention as defined in the appended claims.

What is claimed is:

1. A covering for an architectural opening, comprising:
   a head rail;
   a flexible shade material having a first end attached to the head rail, a second end opposite the first end, and a face defined between the first and second ends;
   a lift cord disposed adjacent the face for moving the shade material between a retracted position and an extended position;
   a sheath defining an internal passage through which the lift cord extends, wherein the sheath is adapted to extend longitudinally as the shade material is moved toward the extended position, and wherein the sheath is adapted to collapse longitudinally as the shade material is moved toward the retracted position; and
   first, second, and third lift cord guides secured to and extending outwardly from the face, wherein the first lift cord guide is disposed at a first location, the second lift cord guide is disposed at a second location farther away from the head rail than the first location, and the third lift cord guide is disposed at a third location farther away from the head rail than the first and second locations, wherein each lift cord guide of the first, second, and third lift cord guides includes a first portion secured to the shade material and a second portion extending away from the first portion and toward the sheath and secured to at least a portion of the sheath such that the lift cord is at least partially surrounded by each lift cord guide of the first, second, and third lift cord guides.

2. The covering of claim 1, wherein the sheath is a woven material.

3. The covering of claim 1, wherein the sheath is unsecured to the shade material between adjacent lift cord guides.

4. The covering of claim 1, wherein the lift cord is axially slidable within the sheath.

5. The covering of claim 1, wherein each lift cord guide comprises a ring.

6. The covering of claim 1, further comprising a bottom rail, and wherein the second end of the shade material is attached to the bottom rail.

7. The covering of claim 6, wherein the lift cord is attached to the bottom rail.

8. A covering for an architectural opening, comprising:
   a head rail;
   a shade material having an upper end attached to the head rail and a lower end opposite the upper end;

first and second lift cords disposed adjacent the shade material for moving the shade material between a retracted position and an extended position;

first and second sets of lift cord guides disposed on the shade material, each set of the first and second sets of lift cord guides being substantially vertically aligned so that a lowermost lift cord guide thereof is in proximity to the lower end of the shade material and an uppermost lift cord guide thereof is in proximity to the head rail, the first lift cord passing through the first set of lift cord guides, the second lift cord passing through the second set of lift cord guides; and first and second collapsible sheaths attached to and at least partially passing through each lift cord guide of the first and second sets of lift cord guides, respectively, each of the first and second collapsible sheaths defining an internal passage extending in a longitudinal direction thereof, the first and second lift cords being entirely disposed within the internal passages of the first and second sheaths between the uppermost and lowermost lift cord guides of the first and second sets of lift cord guides, respectively.

9. The covering of claim 8, wherein the first and second collapsible sheaths are adapted to longitudinally extend as the shade material is lowered toward the extended position and the first and second collapsible sheaths are adapted to longitudinally collapse as the shade material is raised toward the retracted position.

10. The covering of claim 8, wherein each lift cord guide of the first and second sets of lift cord guides includes a first portion secured to the shading material and a second portion secured to the sheath.

11. The covering of claim 10, wherein the first and second lift cords are at least partially surrounded by each lift cord guide of the first and second sets of lift cord guides, respectively.

12. The covering of claim 8, wherein the shade material includes a rear face defined between the upper end and the lower end of the shade material, and wherein the first and second sets of lift cord guides are disposed on the rear face of the shade material.

13. The covering of claim 8, wherein each of the first and second collapsible sheaths is a woven material.

14. The covering of claim 8, wherein the first and second collapsible sheaths are unsecured to the shade material between adjacent lift cord guides of the first and second sets of lift cord guides, respectively.

15. The covering of claim 8, wherein the first and second lift cords are axially slidable within the first and second collapsible sheaths, respectively.

16. The covering of claim 8, wherein each lift cord guide of the first and second sets of lift cord guides comprises a ring.

17. A covering for an architectural opening, comprising:
a head rail;
a bottom rail;
a flexible sheet of shade material extending continuously from the head rail to the bottom rail;
a lift cord extending from the head rail to the bottom rail in adjacent relationship to a rear face of the sheet of shade material; and
a protector including a pair of flexible cords extending along a length of the lift cord and at least partially surrounding the lift cord, the protector secured to the rear face of the sheet of shade material at vertically-spaced locations to establish a fixed length of the protector from one location to the next adjacent location, the protector operatively associated with the lift cord so that the fixed length of the protector from one location to the next adjacent location limits the size of a loop that can be formed in the lift cord.

18. The covering of claim 17, wherein the pair of flexible cords are positioned in a spaced side-by-side relationship and are attached to each other by cross cords extending transversely between the pair of flexible cords.

19. The covering of claim 17, further comprising a plurality of rings secured to the protector and to the sheet of shade material at the vertically-spaced locations to secure the protector to the sheet of shade material.

20. The covering of claim 19, wherein the lift cord is at least partially surrounded by each ring of the plurality of rings.

* * * * *